(12) United States Patent
Wyffels

(10) Patent No.: US 11,841,927 B2
(45) Date of Patent: *Dec. 12, 2023

(54) SYSTEMS AND METHODS FOR DETERMINING AN OBJECT TYPE AND AN ATTRIBUTE FOR AN OBSERVATION BASED ON FUSED SENSOR DATA

(71) Applicant: FORD GLOBAL TECHNOLOGIES, LLC, Dearborn, MI (US)

(72) Inventor: Kevin Lee Wyffels, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/659,670

(22) Filed: Apr. 19, 2022

(65) Prior Publication Data

US 2022/0237419 A1    Jul. 28, 2022

Related U.S. Application Data

(63) Continuation of application No. 17/066,193, filed on Oct. 8, 2020, now Pat. No. 11,361,201.

(51) Int. Cl.
*G06V 20/58* (2022.01)
*G06F 18/2415* (2023.01)
(Continued)

(52) U.S. Cl.
CPC ......... *G06F 18/254* (2023.01); *G05D 1/0248* (2013.01); *G06F 18/24155* (2023.01); *G06V 20/58* (2022.01)

(58) Field of Classification Search
None
See application file for complete search history.

(56) References Cited

U.S. PATENT DOCUMENTS 9,315,192 B1  4/2016  Zhu et al.
9,336,436 B1  5/2016  Dowdall
(Continued)

FOREIGN PATENT DOCUMENTS

JP    2013-214230 A   10/2013
JP    2016223872 A    12/2016
(Continued)

OTHER PUBLICATIONS

Darms, et al.; "Classification and Tracking of Dynamic Objects with Multiple Sensors for Autonomous Driving in Urban Envrionments," pp. 1-6.
(Continued)

*Primary Examiner* — Tahmina N Ansari
(74) *Attorney, Agent, or Firm* — Frank A. MacKenzie; Brooks Kushman, P.C.

(57) ABSTRACT

This document discloses system, method, and computer program product embodiments for controlling a vehicle. For example, the method includes: receiving an observation probability distribution function associated with a target object that was detected by sensor(s) of an autonomous vehicle (AV); identifying a target attribute associated with the target object; detecting a target attribute value associated with the target attribute; and issuing vehicle control instruction(s) that cause AV to adjust driving operation(s) using a future behavior of the target object predicted based on an attribute probability distribution function that defines a probability that the target attribute is actually present for the target object based on probability distribution function(s), wherein the attribute probability distribution function comprises: a probability value associated with the target attribute being present for the target object; and a probability value associated with the target attribute not being present for the target object.

17 Claims, 11 Drawing Sheets

(51) Int. Cl.
  *G06F 18/25* (2023.01)
  *G05D 1/02* (2020.01)

(56) References Cited

U.S. PATENT DOCUMENTS

| | | | |
|---|---|---|---|
| 9,443,163 | B2 | 9/2016 | Springer |
| 9,600,768 | B1 | 3/2017 | Ferguson |
| 9,857,795 | B2 | 1/2018 | Gupta et al. |
| 10,395,144 | B2* | 8/2019 | Zeng ................ G06V 20/58 |
| 10,410,352 | B1 | 9/2019 | Kim et al. |
| 10,599,154 | B2 | 3/2020 | Dean et al. |
| 11,210,537 | B2* | 12/2021 | Koivisto ............. G06V 10/46 |
| 2005/0125154 | A1 | 6/2005 | Kawasaki |
| 2016/0012282 | A1 | 1/2016 | Shima et al. |
| 2019/0026597 | A1* | 1/2019 | Zeng ..................... G06N 3/08 |
| 2019/0086549 | A1 | 3/2019 | Ushani et al. |
| 2019/0258878 | A1* | 8/2019 | Koivisto ............ G06F 18/2414 |
| 2020/0034634 | A1 | 1/2020 | Warshauer-Baker et al. |
| 2020/0307605 | A1 | 10/2020 | Morita et al. |
| 2020/0331465 | A1* | 10/2020 | Herman ................ G08G 1/04 |
| 2021/0158696 | A1* | 5/2021 | McNew ............... G08G 1/0112 |
| 2021/0209785 | A1* | 7/2021 | Unnikrishnan ......... G01S 13/89 |

FOREIGN PATENT DOCUMENTS

| | | |
|---|---|---|
| KR | 1020180070258 A | 6/2018 |
| WO | 2007-110654 A1 | 10/2007 |

OTHER PUBLICATIONS

Otto, C., "Fusion of Data from Heterogeneous Sensors with Distributed Fields of View and Situation Evaluation for Advanced Driver Assistance Systems," Scientific Publishing, pp. 1-262, Jun. 6, 2013.

Aeberhard, M. et al., "Object-Level Fusion for Surround Environment Perception in Automated Driving Applications," Faculty of Electrical Engineering and Information Technology at Technische Universitat Dortmund, pp. 1-221, May 31, 2017.

Koch, W., "Advanced Sensor and Dynamics Models with an Application to Sensor Management," www.intechopen.com, pp. 1-18, Feb. 2009.

* cited by examiner $$p(a_k|z_{1:k},y_{1:k}) = \sum_{q_j \in Q} \sum_{d_{k,j} \in \{F,T\}} p(q_j|z_{1:k}) \, p(d_{k,j}|y_{1:k}) \, p(a|q_j,d_{k,j})$$

- Posterior object type pdf in sample space Q
- Posterior attribute detection pdf
- Soft constraints

| a | d | q | p(q\|z) | p(d\|y) | p(a\|q,d) | Product | Sum |
|---|---|---|---|---|---|---|---|
| F | F | FAST | 0.25 | 0.1 | 0.7 | 0.0175 | 0.665 |
| | | SLOW | 0.7 | 0.1 | 0.9 | 0.063 | |
| | | STATIC | 0.05 | 0.1 | 0.8 | 0.004 | |
| | T | FAST | 0.25 | 0.9 | 0.3 | 0.0675 | |
| | | SLOW | 0.7 | 0.9 | 0.8 | 0.504 | |
| | | STATIC | 0.05 | 0.9 | 0.2 | 0.009 | |
| T | F | FAST | 0.25 | 0.1 | 0.3 | 0.0075 | 0.335 |
| | | SLOW | 0.7 | 0.1 | 0.1 | 0.007 | |
| | | STATIC | 0.05 | 0.1 | 0.2 | 0.001 | |
| | T | FAST | 0.25 | 0.9 | 0.7 | 0.1575 | |
| | | SLOW | 0.7 | 0.9 | 0.2 | 0.126 | |
| | | STATIC | 0.05 | 0.9 | 0.8 | 0.036 | |

$p(a_k|z_{1:k},y_{1:k}) = [0.665, 0.335]$

FIG. 10

SYSTEMS AND METHODS FOR DETERMINING AN OBJECT TYPE AND AN ATTRIBUTE FOR AN OBSERVATION BASED ON FUSED SENSOR DATA

CROSS-REFERENCE TO RELATED APPLICATIONS

The present application is a Continuation Application claiming priority to U.S. patent application Ser. No. 17/066,193 which was filed on Oct. 8, 2020, now U.S. Pat. No. 11,361,201 issued Jun. 14, 2022. The entire content of this application is incorporated herein by reference.

BACKGROUND

It is important to the operation of autonomous vehicles to be able to predict or forecast object behavior. Accurate forecasts of object behavior enables an autonomous vehicle to implement anticipatory planning and control rather than being reactive to its environment. This results in a more natural driving behavior by the autonomous vehicle as well as improved comfort and safety for its passengers.

Autonomous vehicles collect a large amount of data from numerous sensors in order to perform object detection and object behavior prediction. One sensor may collect data that is not available from other sensors. For example, a camera of an autonomous vehicle may be used to detect various object types associated with one or more objects, while LiDAR and radar are relatively limited in their ability to detect object type. On the other hand, cameras are typically limited in the depth information that they can capture. As such, a camera may be unable to consistently distinguish between a car advertisement on the side of a tractor trailer and an actual car on the road. However, LiDAR may clearly differentiate the two by analyzing depth information.

Fusing information from multiple sources is a way to address this problem. But it is sometimes difficult for an autonomous vehicle to determine which information from which sources should be aggregated and fused together to provide a characterization of a detected object.

This document describes methods and systems that are directed to addressing the problems described above, and/or other issues.

SUMMARY

In various implementations, a system includes one or more electronic devices; and a computer-readable storage medium. The computer-readable storage medium includes one or more programming instructions that, when executed, cause one or more of the one or more electronic devices to perform one or more actions. The system receives an observation probability distribution function associated with a target object that was detected by one or more sensors of an autonomous vehicle. The one or more sensors are associated with one or more object type labels. The observation probability distribution function includes a detection likelihood value associated with each of the one or more object type labels. The system identifies a target attribute associated with the target object, and detects a target attribute value associated with the target object. The target attribute is indicative of whether the target attribute was detected by the autonomous vehicle as being present or not. The system determines a first probability distribution function representing a probability of the autonomous vehicle detecting an object having one or more of the one or more object labels based on historical object type detections, determines a second probability distribution function defining a probability of the autonomous vehicle detecting the target attribute based on historical attribute detections, determines a third probability distribution function defining a probability of the target attribute actually being present for the target object based on the target attribute value, and determines an attribute probability distribution function defining a probability that the target attribute is actually present for the target object based on the first probability distribution function, the second probability distribution function, and the third probability distribution function. The attribute probability distribution function includes a probability value associated with the target attribute being present for the target object, and a probability value associated with the target attribute not being present for the target object. The system executes one or more vehicle control instructions that cause the autonomous vehicle to adjust one or more driving operations based on the attribute probability distribution function.

A system may determine a first probability distribution function by identifying a prior probability distribution function associated with a set of one or more leaf nodes of a tree structure, where the prior probability distribution is conditioned on observations received until a current time, transforming the observation probability distribution function to the set of leaf nodes to generate a transformation probability distribution function, and fusing the transformation probability distribution function with the prior probability distribution to generate a posterior probability distribution function.

Transforming the observation probability distribution function to the leaf nodes may include, for each detection likelihood value of the observation probability distribution function, dividing it equally amongst the one or more leaf nodes that are its children.

Using the transformation probability distribution function with the prior probability distribution to generate a posterior probability distribution function may include applying a Bayesian filter to the transformation probability distribution function and the prior probability distribution.

The second probability distribution function may include a probability distribution function over an event that the target object is detected as having the target attribute. The second probability distribution function may be conditioned on all observations made through a current time.

The system may determine a third probability distribution function representing a probability of the target attribute actually being present for the target object based on the target attribute value by determining a third probability distribution that includes a set of combinations of attributes and object types, and for each combination, an associated likelihood value representing a likelihood of the object type of the combination having the attribute of the combination.

The system may determine an attribute probability value representing a probability that the target attribute is actually present for the target object based on the first probability value, the second probability value, and the third probability value by summing a product value across the target object label and the target attribute value. The product value may include a product of the first probability distribution function, the second probability distribution function, and the third distribution function.

The system may execute one or more vehicle control instructions that cause the autonomous vehicle to adjust one or more driving operations based on the attribute probability distribution function by providing data pertaining to the attribute probability distribution to one or more machine learning models, receiving from the one or more machine learning models information pertaining to a predicted trajectory of the target object, and adjusting the one or more driving operations based on the predicted trajectory of the target object.

The present document also concerns implementing systems and methods for controlling an autonomous vehicle. The methods comprising: receiving an observation probability distribution function associated with a target object that was detected by one or more sensors of an autonomous vehicle; identifying a target attribute associated with the target object; detecting a target attribute value associated with the target attribute; and issuing one or more vehicle control instructions that cause the autonomous vehicle to adjust one or more driving operations using a future behavior of the target object predicted based on an attribute probability distribution function that defines a probability that the target attribute is actually present for the target object based on a plurality of probability distribution functions. The attribute probability distribution function comprises: a probability value associated with the target attribute being present for the target object; and a probability value associated with the target attribute not being present for the target object.

In some scenarios, the probability distribution functions comprise: a first probability distribution function representing a probability of the autonomous vehicle detecting an object having one or more of the object labels based on historical object type detections; a second probability distribution function defining a probability of the autonomous vehicle detecting the target attribute based on historical attribute detections; and/or a third probability distribution function defining a probability of the target attribute actually being present for the target object based on the target attribute value. The second probability distribution function can comprise a probability distribution function over an event that the target object is detected as having the target attribute, wherein the second probability distribution function is conditioned on all observations made through a current time. The third probability distribution function may be based on: a set of combinations of attributes and object types; and for each combination, an associated likelihood value representing a likelihood of the object type of the combination having the attribute of the combination. The historical object type detections may be organized in a tree structure.

In those or other scenarios, the attribute probability distribution function is based on a sum of a product value across the target object label and the target attribute value. The product value comprises a product of the first probability distribution function, the second probability distribution function, and the third distribution function. Additionally or alternatively, one or more sensors are associated with one or more object type labels. The observation probability distribution function may comprise a detection likelihood value associated with each of the one or more object type labels.

The implementing systems comprise a memory and a processor coupled to the memory. The processor is configured to: receive an observation probability distribution function associated with a target object that was detected by one or more sensors of an autonomous vehicle; identify a target attribute associated with the target object; detect a target attribute value associated with the target attribute; and execute one or more vehicle control instructions that cause the autonomous vehicle to adjust one or more driving operations using a future behavior of the target object predicted based on an attribute probability distribution function that defines a probability that the target attribute is actually present for the target object based on a plurality of probability distribution functions. The attribute probability distribution function comprises: a probability value associated with the target attribute being present for the target object, and a probability value associated with the target attribute not being present for the target object.

In some scenarios, the probability distribution functions comprise: a first probability distribution function representing a probability of the autonomous vehicle detecting an object having one or more of the object labels based on historical object type detections; a second probability distribution function defining a probability of the autonomous vehicle detecting the target attribute based on historical attribute detections; and/or a third probability distribution function defining a probability of the target attribute actually being present for the target object based on the target attribute value. The second probability distribution function may comprise a probability distribution function over an event that the target object is detected as having the target attribute, wherein the second probability distribution function is conditioned on all observations made through a current time. The third probability distribution function may be is based on: a set of combinations of attributes and object types; and (for each combination) an associated likelihood value representing a likelihood of the object type of the combination having the attribute of the combination. The historical object type detections may be organized in a tree structure.

In those or other scenarios, the attribute probability distribution function is based on a sum of a product value across the target object label and the target attribute value. The product value comprises a product of the first probability distribution function, the second probability distribution function, and the third distribution function. One or more sensors are associated with one or more object type labels. The observation probability distribution function comprises a detection likelihood value associated with each of the one or more object type labels.

The present disclosure also concerns a non-transitory computer-readable medium that stores instructions that is configured to, when executed by at least one computing device, cause the at least one computing device to perform the above described method(s).

BRIEF DESCRIPTION OF THE DRAWINGS

FIG. 10 illustrates an example relationship between object type and attribute compatibility.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Figure 1:
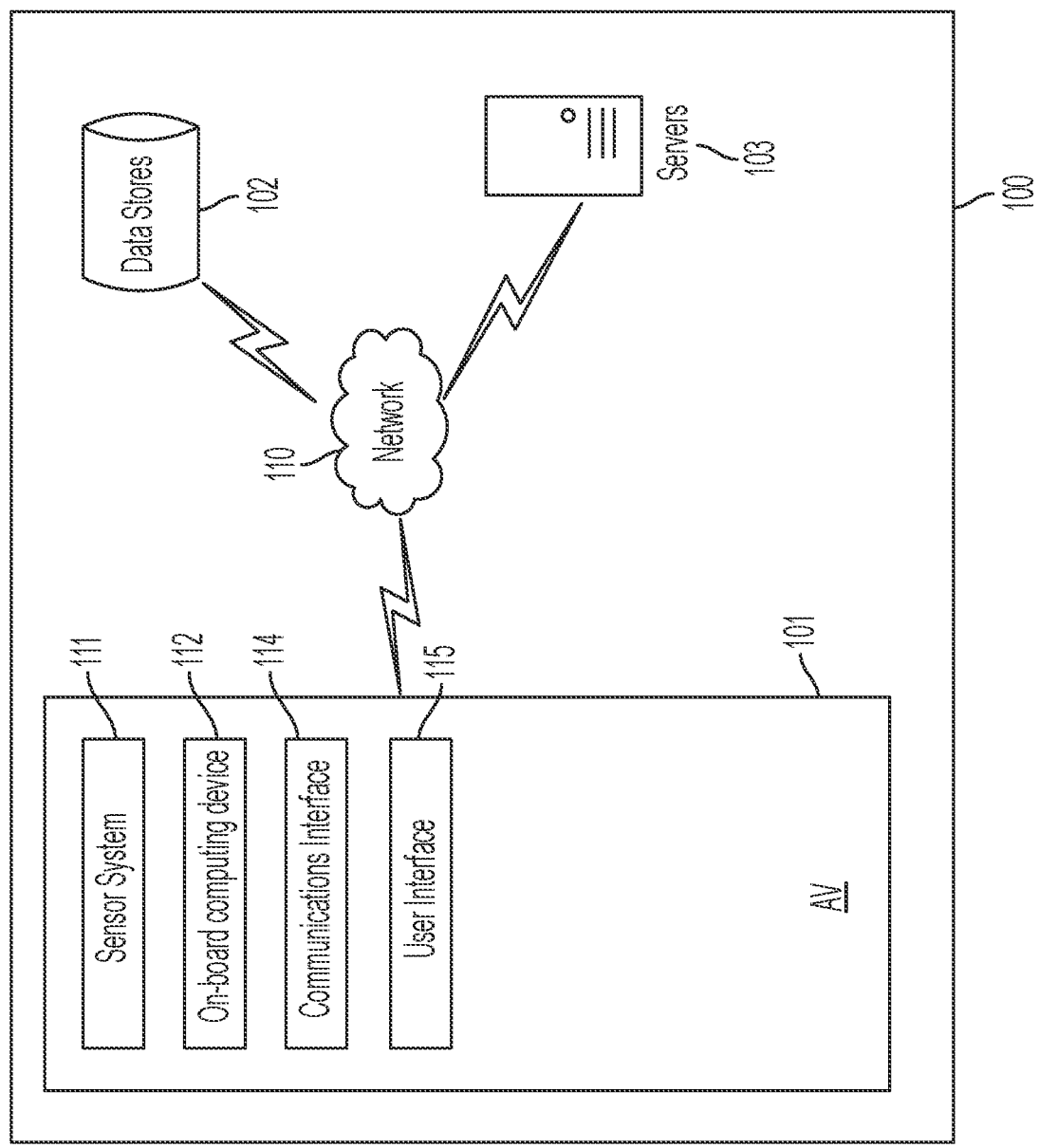
FIG. 1 is a block diagram illustrating an example autonomous vehicle system.

FIG. 1 is a block diagram illustrating an example system 100 that includes an autonomous vehicle 101 in communication with one or more data stores 102 and/or one or more servers 103 via a network 110. Although there is one autonomous vehicle shown, multiple autonomous vehicles may be coupled to each other and/or coupled to data stores 102 and/or servers 103 over network 110. Network 110 may be any type of network such as a local area network (LAN), a wide area network (WAN) such as the Internet, a cellular network, a satellite network, or a combination thereof, and may be wired or wireless. Data store(s) 102 may be any kind of data stores such as, without limitation, map data store(s), traffic information data store(s), user information data store (s), point of interest data store(s), or any other type of content data store(s). Server(s) 103 may be any kind of servers or a cluster of servers, such as, without limitation, Web or cloud servers, application servers, backend servers, or a combination thereof.

As illustrated in FIG. 1, the autonomous vehicle 101 may include a sensor system 111, an on-board computing device 112, a communications interface 114, and a user interface 115. Autonomous vehicle 101 may further include certain components (as illustrated, for example, in FIG. 2) included in vehicles, such as, an engine, wheels, steering wheel, transmission, etc., which may be controlled by the on-board computing device 112 using a variety of communication signals and/or commands, such as, for example, acceleration signals or commands, deceleration signals or commands, steering signals or commands, braking signals or commands, etc.

The sensor system 111 may include one or more sensors that are coupled to and/or are included within the autonomous vehicle 101. Examples of such sensors include, without limitation, a LIDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 101, information about the environment itself, information about the motion of the autonomous vehicle 101, information about a route of the autonomous vehicle, or the like. As autonomous vehicle 101 travels over a surface, at least some of the sensors may collect data pertaining to the surface.

The LIDAR system may include a sensor configured to sense or detect objects in an environment in which the autonomous vehicle 101 is located. Generally, LIDAR system is a device that incorporates optical remote sensing technology that can measure distance to a target and/or other properties of a target (e.g., a ground surface) by illuminating the target with light. As an example, the LIDAR system may include a laser source and/or laser scanner configured to emit laser pulses and a detector configured to receive reflections of the laser pulses. For example, the LIDAR system may include a laser range finder reflected by a rotating mirror, and the laser is scanned around a scene being digitized, in one, two, or more dimensions, gathering distance measurements at specified angle intervals. The LIDAR system, for example, may be configured to emit laser pulses as a beam. Optionally, the beam may be scanned to generate two dimensional or three dimensional range matrices. In an example, the range matrices may be used to determine distance to a given vehicle or surface by measuring time delay between transmission of a pulse and detection of a respective reflected signal. In some examples, more than one LIDAR system may be coupled to the first vehicle to scan a complete 360° horizon of the first vehicle. The LIDAR system may be configured to provide to the computing device a cloud of point data representing the surface(s), which have been hit by the laser. The points may be represented by the LIDAR system in terms of azimuth and elevation angles, in addition to range, which can be converted to (X, Y, Z) point data relative to a local coordinate frame attached to the vehicle. Additionally, the LIDAR may be configured to provide intensity values of the light or laser reflected off the surfaces that may be indicative of a surface type. In examples, the LIDAR system may include components such as light (e.g., laser) source, scanner and optics, photo-detector and receiver electronics, and position and navigation system. In an example, The LIDAR system may be configured to use ultraviolet (UV), visible, or infrared light to image objects and can be used with a wide range of targets, including non-metallic objects. In one example, a narrow laser beam can be used to map physical features of an object with high resolution.

It should be noted that the LIDAR systems for collecting data pertaining to the surface may be included in systems other than the autonomous vehicle 101 such as, without limitation, other vehicles (autonomous or driven), robots, satellites, etc.

Figure 2:
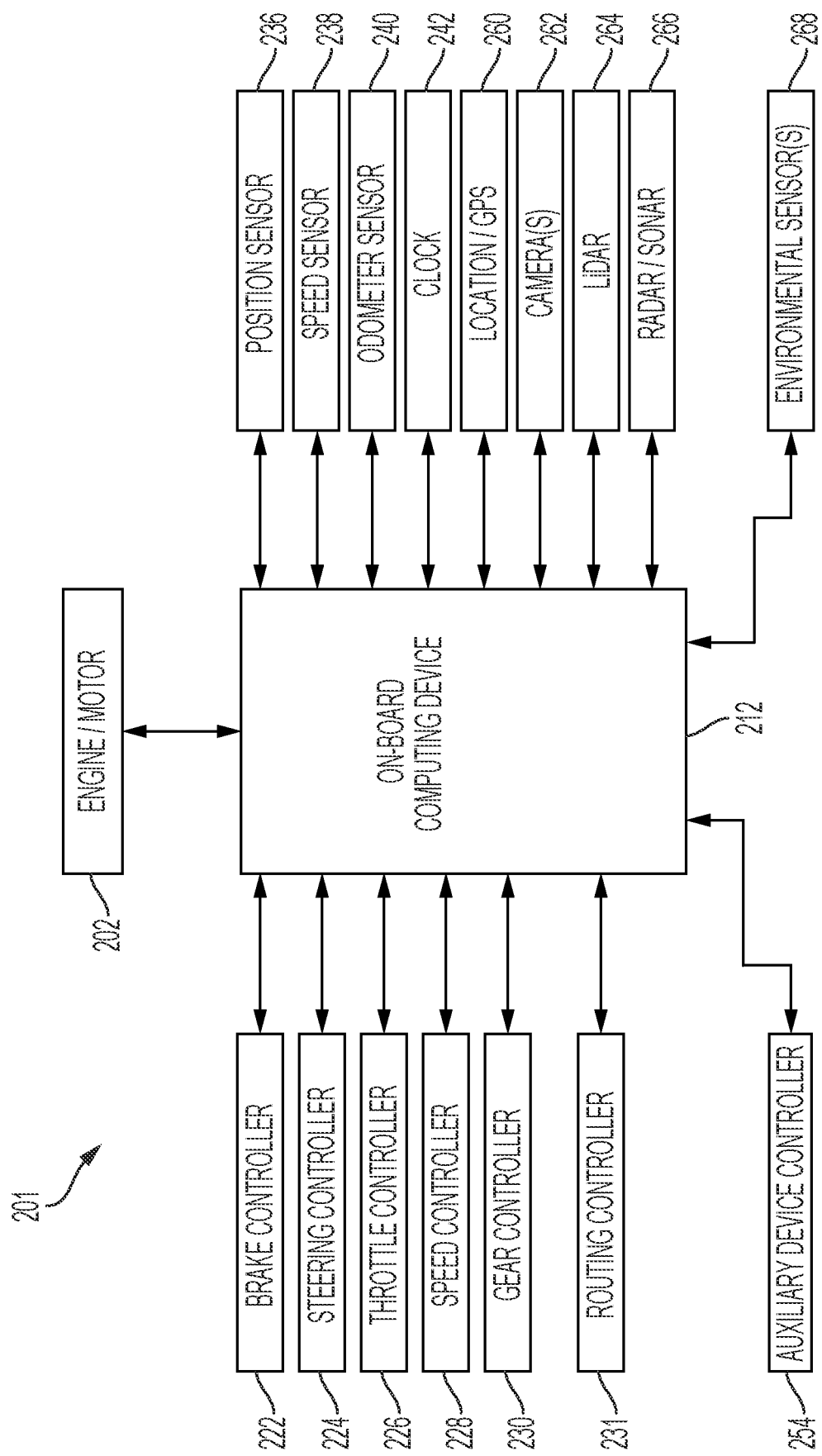
FIG. 2 illustrates an example vehicle controller system.

FIG. 2 illustrates an example system architecture for a vehicle 201, such as the autonomous vehicle 101 of FIG. 1 autonomous vehicle. The vehicle 201 may include an engine or motor 202 and various sensors for measuring various parameters of the vehicle and/or its environment. Operational parameter sensors that are common to both types of vehicles include, for example: a position sensor 236 such as an accelerometer, gyroscope and/or inertial measurement unit; a speed sensor 238; and an odometer sensor 240. The vehicle 101 also may have a clock 242 that the system architecture uses to determine vehicle time during operation. The clock 242 may be encoded into the vehicle on-board computing device 212, it may be a separate device, or multiple clocks may be available.

The vehicle 201 also may include various sensors that operate to gather information about the environment in which the vehicle is traveling. These sensors may include, for example: a location sensor 260 such as a GPS device; object detection sensors such as one or more cameras 262; a LiDAR sensor system 264; and/or a radar and or and/or a sonar system 266. The sensors also may include environmental sensors 268 such as a precipitation sensor and/or ambient temperature sensor. The object detection sensors may enable the vehicle 201 to detect objects that are within a given distance or range of the vehicle 201 in any direction, while the environmental sensors collect data about environmental conditions within the vehicle's area of travel. The system architecture will also include one or more cameras 262 for capturing images of the environment.

During operations, information is communicated from the sensors to an on-board computing device 212. The on-board computing device 212 analyzes the data captured by the sensors and optionally controls operations of the vehicle based on results of the analysis. For example, the on-board computing device 212 may control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers such as an auxiliary device controller 254.

Geographic location information may be communicated from the location sensor 260 to the on-board computing device 212, which may then access a map of the environment that corresponds to the location information to determine known fixed features of the environment such as streets, buildings, stop signs and/or stop/go signals. Captured images from the cameras 262 and/or object detection information captured from sensors such as a LiDAR system 264 is communicated from those sensors) to the on-board computing device 212. The object detection information and/or captured images may be processed by the on-board computing device 212 to detect objects in proximity to the vehicle 201. In addition or alternatively, the vehicle 201 may transmit any of the data to a remote server system 103 (FIG. 1) for processing. Any known or to be known technique for making an object detection based on sensor data and/or captured images can be used in the embodiments disclosed in this document.

The on-board computing device 212 may obtain, retrieve, and/or create map data that provides detailed information about the surrounding environment of the autonomous vehicle 201. The on-board computing device 212 may also determine the location, orientation, pose, etc. of the AV in the environment (localization) based on, for example, three dimensional position data (e.g., data from a GPS), three dimensional orientation data, predicted locations, or the like. For example, the on-board computing device 212 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 212 in analyzing the surrounding environment of the autonomous vehicle 201.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the on-board computing device 212 may also include and/or may receive information relating to the trip or route of a user, real-time traffic information on the route, or the like.

The on-board computing device 212 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various implementations, an on-board computing device 212 may determine perception information of the surrounding environment of the autonomous vehicle 201. Based on the sensor data provided by one or more sensors and location information that is obtained, the on-board computing device 212 may determine perception information of the surrounding environment of the autonomous vehicle 201. The perception information may represent what an ordinary driver would perceive in the surrounding environment of a vehicle. The perception data may include information relating to one or more objects in the environment of the autonomous vehicle 201. For example, the on-board computing device 212 may process sensor data (e.g., LIDAR or RADAR data, camera images, etc.) in order to identify objects and/or features in the environment of autonomous vehicle 201. The objects may include traffic signals, road way boundaries, other vehicles, pedestrians, and/or obstacles, etc. The on-board computing device 212 may use any now or hereafter known object recognition algorithms, video tracking algorithms, and computer vision algorithms (e.g., track objects frame-to-frame iteratively over a number of time periods) to determine the perception.

In some embodiments, the on-board computing device 212 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 212 may perform one or more prediction and/or forecasting operations. For example, the on-board computing device 212 may predict future locations, trajectories, and/or actions of one or more objects. For example, the on-board computing device 212 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 201, the surrounding environment, and/or their relationship(s). For example, if an object is a vehicle and the current driving environment includes an intersection, the on-board computing device 212 may predict whether the object will likely move straight forward or make a turn. If the perception data indicates that the intersection has no traffic light, the on-board computing device 212 may also predict whether the vehicle may have to fully stop prior to enter the intersection.

In various embodiments, the on-board computing device 212 may determine a motion plan for the autonomous vehicle. For example, the on-board computing device 212 may determine a motion plan for the autonomous vehicle based on the perception data and/or the prediction data. Specifically, given predictions about the future locations of proximate objects and other perception data, the on-board computing device 212 can determine a motion plan for the autonomous vehicle 201 that best navigates the autonomous vehicle relative to the objects at their future locations.

In one or more embodiments, the on-board computing device 212 may receive predictions and make a decision regarding how to handle objects in the environment of the autonomous vehicle 201. For example, for a particular object (e.g., a vehicle with a given speed, direction, turning angle, etc.), the on-board computing device 212 decides whether to overtake, yield, stop, and/or pass based on, for example, traffic conditions, map data, state of the autonomous vehicle, etc. Furthermore, the on-board computing device 212 also plans a path for the autonomous vehicle 201 to travel on a given route, as well as driving parameters (e.g., distance, speed, and/or turning angle). That is, for a given object, the on-board computing device 212 decides what to do with the object and determines how to do it. For example, for a given object, the on-board computing device 212 may decide to pass the object and may determine whether to pass on the left side or right side of the object (including motion parameters such as speed). The on-board computing device 212 may also assess the risk of a collision between a detected object and the autonomous vehicle 201. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 212 may execute one or more control instructions to perform a cautious maneuver (e.g., mildly slow down, accelerate, change lane, or swerve). In contrast, if the collision cannot be avoided, then the on-board computing device 112 may execute one or more control instructions for execution of an emergency maneuver (e.g., brake and/or change direction of travel).

As discussed above, planning and control data regarding the movement of the autonomous vehicle is generated for execution. The on-board computing device 212 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 1, the communications interface 114 may be configured to allow communication between autonomous vehicle 101 and external systems, such as, for example, external devices, sensors, other vehicles, servers, data stores, databases etc. Communications interface 114 may utilize any now or hereafter known protocols, protection schemes, encodings, formats, packaging, etc. such as, without limitation, Wi-Fi, an infrared link, Bluetooth, etc. User interface system 115 may be part of peripheral devices implemented within vehicle 101 including, for example, a keyword, a touch screen display device, a microphone, and a speaker, etc.

Figure 3:
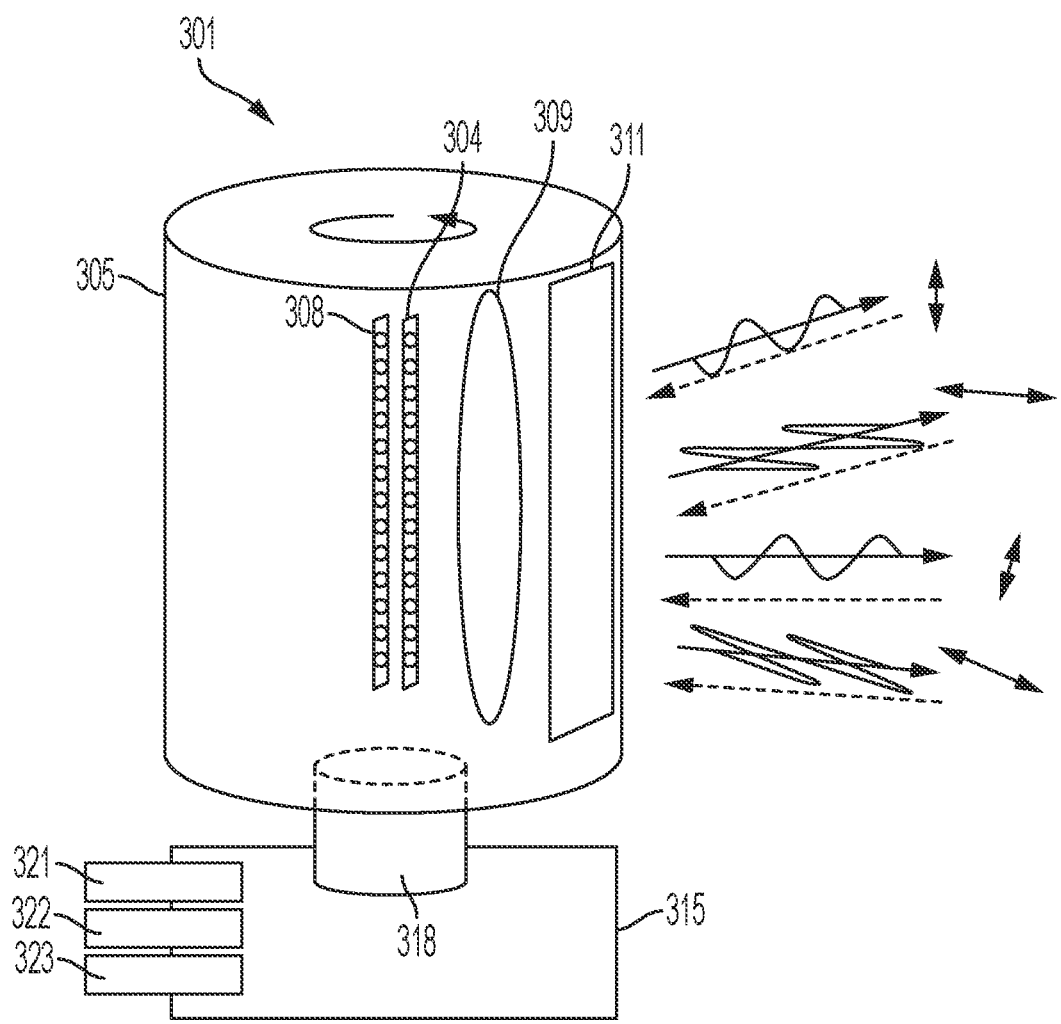
FIG. 3 shows an example LiDAR system.

FIG. 3 shows an example LiDAR system 201 as may be used in various embodiments. As shown in FIG. 3, the LiDAR system 201 includes a housing 205 which may be rotatable 360° about a central axis such as hub or axle 218. The housing may include an emitter/receiver aperture 211 made of a material transparent to light. Although the example shown in FIG. 3 has a single aperture, in various embodiments, multiple apertures for emitting and/or receiving light may be provided. Either way, the system can emit light through one or more of the aperture(s) 211 and receive reflected light back toward one or more of the aperture(s) 211 as the housing 205 rotates around the internal components. In an alternative embodiment, the outer shell of housing 205 may be a stationary dome, at least partially made of a material that is transparent to light, with rotatable components inside of the housing 205.

Inside the rotating shell or stationary dome is a light emitter system 204 that is configured and positioned to generate and emit pulses of light through the aperture 211 or through the transparent dome of the housing 205 via one or more laser emitter chips or other light emitting devices. The emitter system 204 may include any number of individual emitters, including for example 8 emitters, 64 emitters or 128 emitters. The emitters may emit light of substantially the same intensity, or of varying intensities. The individual beams emitted by 204 will have a well-defined state of polarization that is not the same across the entire array. As an example, some beams may have vertical polarization and other beams may have horizontal polarization. The LiDAR system will also include a light detector 208 containing a photodetector or array of photodetectors positioned and configured to receive light reflected back into the system. The emitter system 204 and detector 208 would rotate with the rotating shell, or they would rotate inside the stationary dome of the housing 205. One or more optical element structures 209 may be positioned in front of the light emitting unit 204 and/or the detector 208 to serve as one or more lenses or waveplates that focus and direct light that is passed through the optical element structure 209.

One or more optical element structures 309 may be positioned in front of the mirror 302 to focus and direct light that is passed through the optical element structure 309. As shown below, the system includes an optical element structure 309 positioned in front of the mirror 303 and connected to the rotating elements of the system so that the optical element structure 309 rotates with the mirror 302. Alternatively or in addition, the optical element structure 309 may include multiple such structures (for example lenses and/or waveplates). Optionally, multiple optical element structures 309 may be arranged in an array on or integral with the shell portion 311.

Optionally, each optical element structure 309 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

The LiDAR system will include a power unit 321 to power the laser emitter unit 304, a motor 303, and electronic components. The LiDAR system will also include an analyzer 315 with elements such as a processor 322 and non-transitory computer-readable memory 323 containing programming instructions that are configured to enable the system to receive data collected by the light detector unit, analyze it to measure characteristics of the light received, and generate information that a connected system can use to make decisions about operating in an environment from which the data was collected. Optionally, the analyzer 315 may be integral with the LiDAR system 301 as shown, or some or all of it may be external to the LiDAR system and communicatively connected to the LiDAR system via a wired or wireless communication network or link.

The present disclosure generally describes a scalable and extensible probabilistic framework for fusing disparate information from multiple autonomous vehicle sensors into a single estimation of object type and attribute for an object. The consideration of multiple sensors improves overall accuracy by leveraging the strengths of the sensors and providing multi-sensor redundancy.

Figure 4:
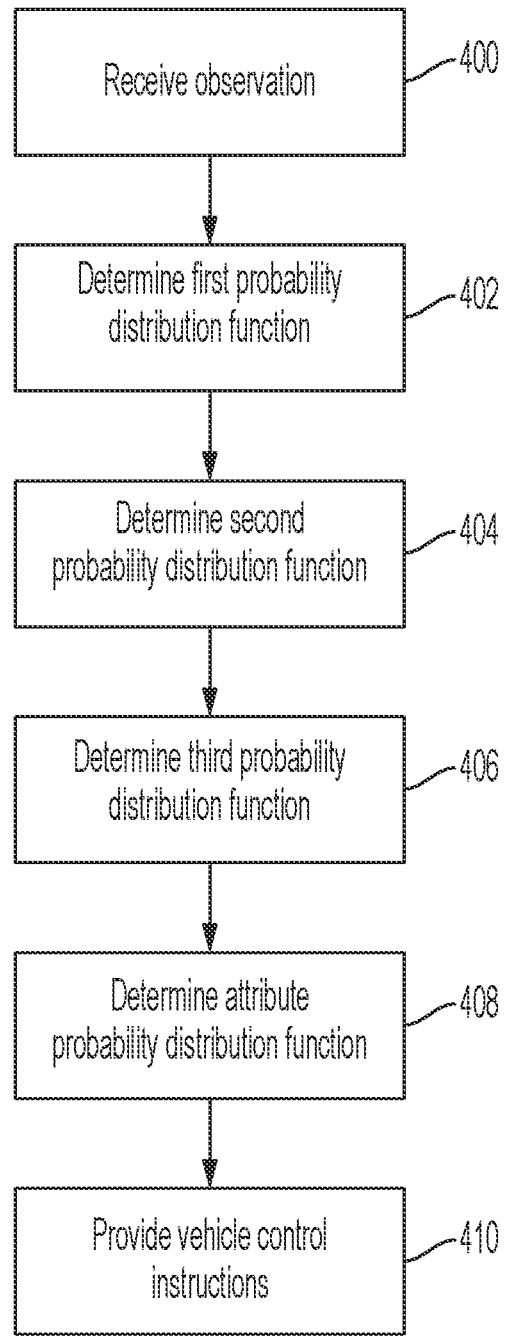
FIG. 4 illustrates a flow chart of an example method of estimating an object type and attribute presence according to an embodiment.

FIG. 4 illustrates a flow chart of an example method of estimating an object type and attribute presence according to an embodiment. As illustrated by FIG. 4, an observation may be received 400. The observation may be received from one or more sensors of a perception subsystem of an autonomous vehicle, and the observation may correspond to an object that was observed by the autonomous vehicle. The observation may include an estimated object type associated with the object and an attribute value associated with one or more attributes. The attribute value may be binary indicating whether the attribute was detected as being present. Attributes will be discussed later in this disclosure, but an example of an attribute is whether an object is articulated (e.g., a tractor trailer or bus). For example, an attribute value of '0' for an 'articulated' attribute may indicate that the object was not detected as being articulated, while an attribute value of '1' for the attribute may indicate that the object was detected as being articulated.

Referring back to FIG. 4, the system may determine 402 a first probability distribution function representing a probability of an autonomous vehicle detecting an object having the object label of the observation. This determination may be based on historical object type detections. In various embodiments, these historical object type detections may be organized in a tree structure as discussed below, and may be used to estimate an object type and/or attribute for an observation.

Figure 5:
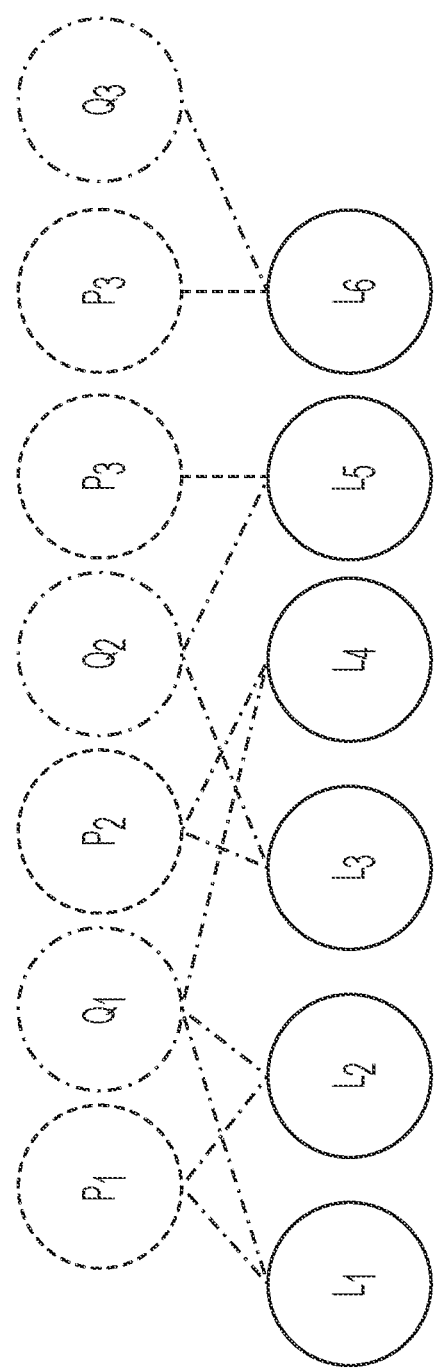
FIG. 5 illustrates an example tree structure.

FIG. 5 illustrates an example of a tree structure according to an embodiment. As illustrated by FIG. 5, a tree may have one or more sample spaces. A sample space refers to a set of one or more object type labels that are measurable by one or more sensors of an autonomous vehicle and represent a class of all possible outcomes associated with the sensor. In terms of a tree structure, an object type label may be referred to in this disclosure as a "node".

For example, if the sensor is a radar sensor, a class associated with the sensor may be {fast, slow, static} where "fast", "slow", and "static" are each object type labels. These three outcomes may represent all possible outcomes for a radar sensor. In other words, data collected by a radar sensor may correspond to only a fast object, a slow object, or a static object.

FIG. 5 illustrates three example sample spaces {L, P, Q}. Sample space P may represent data that is collected from one or more LiDAR sensors. For example, data that is a part of sample space P may be indicative of object type associated with one or more observations. For instance, in FIGS. 4, P1, P2, P3, and P4, each represent a object type label in sample space P, where P1 includes data associated with objects determined to be vehicles, P2 includes data associated with objects determined to be bicycles, P3 includes data associated with objects determined to be pedestrians, and P4 includes data associated with objects determined to be part of the background. Objects in the background may include, without limitation, road cones, bollards, signage, and/or the like. Additional and/or alternative data or types of data may be used within the scope of this disclosure.

Sample space Q may represent data that is collected from one or more radar sensors. For example, data that is part of sample space Q may be indicative of motion or movement of one or more observations. For instance, in FIG. 5, Q1, Q2, and Q3 each represent an object type label in sample space Q, where Q1 includes data associated with observations determined to be fast objects, Q2 includes data associated with observations determined to be slow objects, and Q3 includes data associated with observations determined to be static objects. Additional and/or alternative data or types of data may be used within the scope of this disclosure.

Sample space L may represent a minimum set of object types that are needed to support one or more tree structures. For instance, in FIG. 5, {L1, . . . , L6} each represent an object type label of sample space L, where:

L1 includes data associated with observations determined to be small vehicles L2 includes data associated with observations determined to be large vehicles L3 includes data associated with observations determined to be bicycles L4 includes data associated with observations determined to be motorcycles L5 includes data associated with observations determined to be pedestrians L6 includes data associated with observations determined to be background In various embodiments, for each tree, each child node may connect to only one parent such that there is only one path from any leaf label to the root of the tree.

Within each sample space, each node or label must be mutually exclusive. This may be represented by: $p(\ell_i | \ell_j) = 0 \ \forall \ \{i, j\} \ \varepsilon \ \mathbb{S}$, where l represents a node or label, and S represents a sample space.

Each sample space may be exhaustive. This means that the object type labels included in each sample space must represent the exhaustive options associated with the sample space, and may be represented by:

$$\sum_{i \in \mathbb{S}} p(\ell_i) = 1$$

In various embodiments, at a particular point in time, a probability distribution function (also referred to in this disclosure as a "pdf") may exist over one or more sample spaces. A probability distribution function may have a detection likelihood value that is associated with each object type label of the sample space. A detection likelihood value represents a probability that an observation corresponds to that object type label. A probability distribution function may be conditioned on all observations up through a previous time step.

For example, referring back to FIG. 5, a probability distribution function over sample space L (the leaf labels) through time step k−1 may be represented as:

$P(L|z_{1:k-1}) = [0.12, 0.18, 0.50, 0.07, 0.03, 0.10]$

From this probability distribution function, it can be discerned that, based on past observations, an object is most likely to be a bicycle, as the object type label L3 is associated with a detection likelihood value having the highest value (e.g., 0.50).

In various embodiments, a classifier (i.e., a trained model) may generate one or more of the detection likelihood values. A classifier may be associated with a particular sensor or sensor type. For instance, a radar sensor may be associated with a first classifier that receives data pertaining to an observation captured by the radar sensor and determining one or more detection likelihood values associated with the observation. The detection likelihood values may each correspond to a label associated with the sensor. For example, the radar sensor may be associated with the labels {fast, slow, static}. As such, the classifier associated with the radar sensor may for an observation determine a detection likelihood value for each of the label values. For example, the classifer may determine the detection likelihood values {0.20, 0.70, 0.10}, meaning that there is a 20% likelihood that the observation is a fast object, a 70% likelihood that the observation is a slow object, and a 10% likelihood that the observation is a static object.

In various embodiments, a classifier may learn and predict a probability distribution over a class. In other embodiments, a classifier may learn and predict a probability distribution over a class and then encode the probability distribution using a confusion matrix. A confusion matrix may include information about past predictions made by the classifier and the number of times that such predictions were actually correction. For example, a confusion matrix may include information that of the 'n' times the classifier predicted an observation was a VEHICLE, it was correct m<n times, that the object was actually a PEDESTRIAN k times, and/or the like. The encoded probability distribution may be normalized.

Figure 6:
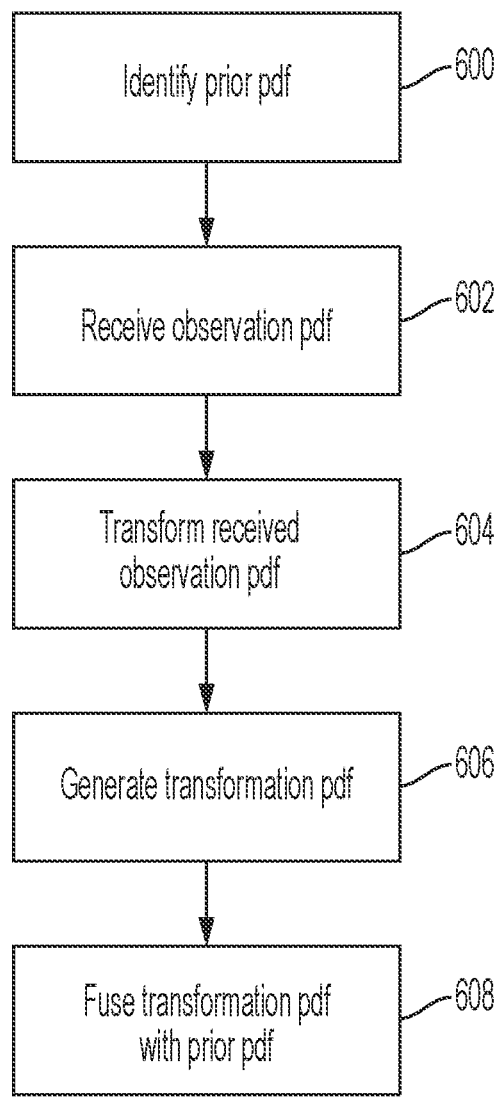
FIG. 6 illustrates a flow chart of an example method of fusing sensor measurements from an autonomous vehicle.

FIG. 6 illustrates a flow chart of an example method of fusing sensor measurements from an autonomous vehicle according to an embodiment. As illustrated in FIG. 6, a system may identify 600 a prior probability distribution function across a sample space associated with leaf nodes of a tree structure (referred to throughout this disclosure as the "leaf sample space"). In various embodiments, a sensor subsystem 111 of an autonomous vehicle may identify a prior probability distribution function. However, it is understood that other subsystems of an autonomous vehicle or autonomous vehicle system may perform this step.

The prior probability distribution function may be conditioned on all observations collected by the system up through time step k−1. The following example prior probability distribution function will be referred to throughout the discussion of FIG. 6:

Prior pdf=$P(L|z_{1:k-1})$=[0.12, 0.18, 0.50, 0.07, 0.03, 0.10]

The system may receive 602 an observation probability distribution function across another sample space at time step k from a classifier associated with a sensor of an autonomous vehicle. For example, a perception subsystem 122 may receive 602 an observation probability distribution function that is based on measurements obtained by a sensor subsystem. Referring to the above example, the system may receive the following example observation distribution function across the P sample space from FIG. 5 from a classifier of a sensor:

Observation pdf=$p(z_k|P)$=[0.20, 0.50, 0.20, 0.10]

The system (e.g., a perception subsystem 122) may transform 604 the received observation probability distribution function to one or more sample spaces of its children. The system may transform 604 the received observation probability distribution function to the lead sample space by, for each object type label or label in the observation probability distribution function, dividing its detection likelihood value equally over its child nodes. For example, referring to the example observation distribution function above, object type label P1 may be associated with a detection likelihood value of 0.20. The system may divide this value of 0.20 by two since node P1 has two child nodes.

The system may generate 606 a transformation probability distribution function associated with the transformation. The system may generate 606 a transformation probability distribution function by dividing each detection likelihood value from the observation distribution function by the number of its associated child nodes, and adding that value to the transformation probability distribution function for each child node. The following illustrates an example transformation probability distribution function associated with the example observation probability distribution function referred to above:

Transformation pdf=$P(z_k|L)$=[0.10, 0.10, 0.25, 0.25, 0.20, 0.10]

As illustrated from the transformation pdf, an observation is most likely to be a bicycle (object type label L3 with a detection likelihood value of 0.25) or a motorcycle (object type label L4 with a detection likelihood value of 0.25).

The system may fuse 608 the transformation probability distribution function with the prior probability distribution function to generate a posterior probability distribution function. The posterior probability distribution function may be the result of fusing the observation at time k with the prior observations through time k−1. The system may perform this fusion using a Bayesian filter. For example, a Bayesian filter may be applied as follows:

$$\text{Posterior } pdf = \frac{\text{transformation } pdf * \text{prior } pdf}{(\text{sum over } L) * (\text{transformation } pdf) * (\text{prior } pdf)}$$

The posterior pdf for the above example can be represented as:

Posterior pdf=$p(L|z_{1:k})$=[0.06, 0.10, 0.66, 0.09, 0.04, 0.05]

As illustrated by the example posterior pdf, the detection likelihood value associated with L3 (0.66) increased from its value from the prior pdf (0.50), indicating that there is greater confidence that an observation is a bicycle under the posterior pdf than the prior pdf.

The posterior pdf may reflect the current prediction state until a new observation pdf is received from one or more sensors of an autonomous vehicle. When this occurs, steps 602-608 may be repeated.

In various embodiments, a posterior pdf may be transformed to one or more sample spaces. A posterior pdf may be transformed to a sample space in order to ascertain how a posterior pdf may affect one or more detection likelihood values of one or more other sample spaces. For instance, referring to the example above, the posterior pdf is determined in response to receiving an observation pdf pertaining to sample space P. But the effect of the posterior pdf on sample space Q may need to be determined.

Figure 7:
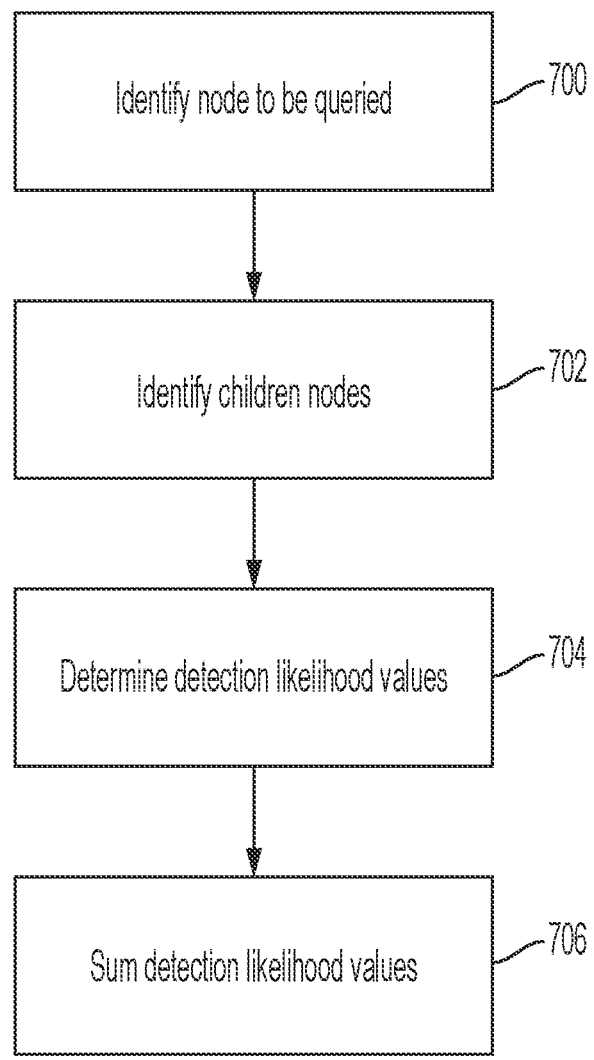
FIG. 7 illustrates a flow chart of an example method of transforming a posterior pdf to one or more sample spaces.

FIG. 7 illustrates a flow chart of an example method of transforming a posterior pdf to one or more sample spaces according to an embodiment. The process illustrated by FIG. 7 may be performed by a subsystem of an autonomous vehicle system (e.g., a forecasting and prediction subsystem 123) querying a tree structure to ascertain one or more updated detection likelihood values of a sample space as a result of the posterior pdf. As another example, a system user may query a tree structure to ascertain one or more updated detection likelihood values of a sample space as a result of the posterior pdf.

As illustrated by FIG. 7, a posterior pdf may be transformed to a sample space by summing the detection likelihood values associated with its children. The system may identify 700 a node of the sample space that is to be queried. The system may identify 702, using a tree structure, the children nodes associated with the identified node. For each identified child node, the system may determine 704 the detection likelihood value associated with the child node from the posterior pdf. The system may sum 706 the determined detection likelihood values to determine an updated detection likelihood value for the identified node. This process may be repeated for other nodes in the queried sample space.

For example, referring back to the above example, a user may want to query sample space Q in light of the posterior probability distribution function p (L|z1:1)=[0.06, 0.10, 0.66, 0.09, 0.04, 0.05]

Referring back to FIG. 5, it is seen that object type label Q1 has children L1, L2, and L4. An updated detection likelihood value can be determined for Q1 by summing the detection likelihood values associated with L1, L2 and L4 from the posterior pdf. As such, the updated detection likelihood value for Q1=0.06+010+0.09=0.25. The following represents the result of transforming the posterior pdf to the entire sample space Q:

$p(Q|Z_{1:k})$=[0.25, 0.7, 0.05]

As illustrated by this pdf over the Q sample space, it is more likely that an observation will be a slow moving object (Q2) based on this pdf.

Referring back to FIG. 4, the system may determine 404 a second probability distribution value representing a probability of an autonomous vehicle detecting the attribute of the observation based on historical attribute detections. Orthogonal binary attributes may be modeled to supplement one or more object type labels. An orthogonal binary attribute (also referred to in this disclosure as "attribute") refers to a descriptor of an object type label that is either true or false. An attribute may be static, meaning that its state is always active or never active. An attribute may be dynamic, meaning that its state can transition from active to inactive.

An example attribute may be "EMERGENCY". Rather than adding unique object type labels for each emergency-related object that an autonomous vehicle may encounter, object type labels may be modeled as having an EMERGENCY attribute. For instance, a police car may be modeled as a VEHICLE object type with an EMERGENCY attribute. A police motorcycle may be modeled as a MOTORCYCLE object type with an EMERGENCY attribute. Similarly, a police officer may be modeled as a PEDESTRIAN object type with an EMERGENCY attribute. Additional and/or alternate object types and/or attributes may be used within the scope of this disclosure.

As another example, object type labels may be modeled as having an ARTICULATED attribute. Rather than adding unique object type labels for each articulated object that an autonomous vehicle may encounter, object type labels may be modeled as having an ARTICULATED attribute. For instance, a tractor trailer may be modeled as a LARGE_VEHICLE object type with an ARTICULATED attribute. An articulated bus may be modeled as a CITY_BUS object type with an ARTICULATED attribute. Additional and/or alternate object types and/or attributes may be used within the scope of this disclosure.

Attributes may be modeled as mutually independent such that:

$p(d_i|d_j)=p(d_i) \forall_{i \neq j}$

Where $d_i$ and $d_j$ represent two different attributes.

The probability that an attribute is observed given a sequence of attribute detections may be estimated using parallel binary Bayes filters (BBF), one per attribute. For a given track and attribute, let:

α ε {F,T}=The event that the attribute is present
d ε {F,T}=The event that the attribute is observed
$\ell$ ε {(1, . . . , N}=The object type label
$\tilde{z}_{1:k}$=History of object type detections
$\mathcal{Y}_{1:k}$=History of attribute detections Referring back to FIG. 4, the system may determine 406 a third probability distribution function representing a probability of the attribute from the observation actually being present for the object based on its attribute value. Object type and attribute compatibility may be considered as part of this determination. The system may determine 408 an attribute probability distribution function representing a probability that the observed attribute is actually present for the observed object based on the first probability distribution function, the second probability distribution function, and the third probability distribution function.

The attribute probability distribution function may be considered as follows:

$$p(a_k \mid z_{1:k}, y_{1:k}) = \sum_{\ell_k} \sum_{d_k} p(\ell_k, d_k, a_k \mid z_{1:k}, y_{1:k})$$

$$= \sum_{\ell_k} \sum_{d_k} p(\ell_k \mid z_{1:k}) p(d_k \mid y_{1:k}) p(a_k \mid \ell_k, d_k)$$

Where:

$p(\ell_k \mid z_{1:k})$ represents a posterior pdf
$p(d_k \mid y_{1:k})$ represents a posterior BBF
$p(a_k \mid d_k, \ell_k)$ represents a set of compatibility constraints The compatibility description above may be based on the following assumptions:

$p(\ell_k \mid z_{1:k}, y_{1:k}) = p(\ell_k \mid z_{1:k})$ $p(d_k \mid \ell_k, z_{1:k}, y_{1:k}) = p(d_k \mid y_{1:k})$ $p(a_k \mid d_k, \ell_k, z_{1:k}, y_{1:k}) = p(a_k \mid d_k, \ell_k)$ In various embodiments, the set of compatibility constraints may be one or more probabilistic object type attribute compatibility constraints that are encoded as probabilities. These constraints may defined rules or constraints about a relationship between an object type and an attribute. An example compatibility constraint may be that a BICYCLE object type will not have an ARTICULATED attribute.

In various embodiments, one or more of the compatibility constraints may be considered "soft constraints" meaning that they do not dictate which object types and attributes can or cannot be used together. Rather, they provide insight into which object types and attributes are likely or unlikely to be used together. In some embodiments, one or more of the compatibility constraints may be considered "hard constraints" meaning that they do require a certain object type and attribute to not be used together. A hard constraint may have a probability value of zero.

Figure 8:
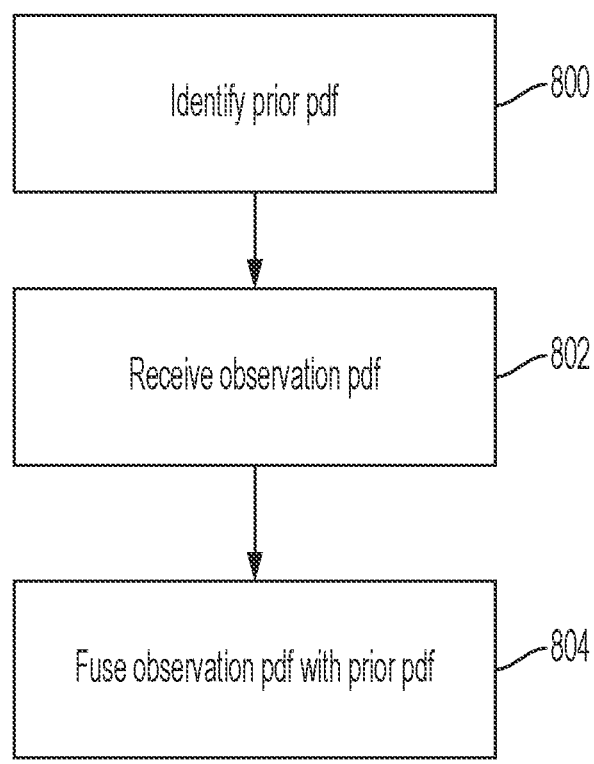
FIG. 8 illustrates a flow chart of an example method of fusing sensor measurements from an autonomous vehicle that have an attribute.

FIG. 8 illustrates a flow chart of an example method of fusing sensor measurements from an autonomous vehicle that have an attribute according to an embodiment. As illustrated in FIG. 8, a system may identify 800 a prior probability distribution function over an event that an object that is detected has a particular attribute. The prior probability distribution function may be conditioned on all observations collected by the system up through time step k−1. The following example prior probability distribution function will be referred to throughout the discussion of FIG. 8:

Prior pdf=$P(d \mid y_{1:k-1})$=[0.40, 0.60]

Because an attribute is either present or not, a probability distribution function will have two possible values—a probability that the attribute is not present, and a probability that the attribute is present. For example, referring to the above example, if the applicable attribute is ARTICULATED, then 0.40 represents the probability that an object is not articulated, and 0.60 represents the probability that an object is articulated. Additional and/or alternate probabilities may be used within the scope of this disclosure.

The system may receive 802 an observation probability distribution function over an event at time step k from a classifier associated with a sensor of an autonomous vehicle.

For example, a perception subsystem 122 may receive 802 an observation probability distribution function that is based on measurements obtained by a sensor subsystem. Referring to the above example, the system may receive 802 the following example observation distribution function from a classifier of a sensor:

Observation pdf=$p(y_k \mid d)$=[0.15, 0.85]

As such, the observation pdf may indicate that there is a probability of 0.15 over an observation that an object is not articulated, and a 0.85 probability over the observation that the object is articulated.

The system (e.g., a perception subsystem 122) may fuse 804 the observation probability distribution function with the prior probability distribution function to generate a posterior probability distribution function. The posterior probability distribution function may be the result of fusing the observation at time k with the prior observations through time k−1. The system may perform this fusion using a Bayesian filter. For example, a Bayesian filter may be applied as follows:

$$\text{Posterior } pdf = \frac{\text{observation } pdf * \text{prior } pdf}{(\text{sum over } L) * (\text{observation } pdf) * (\text{prior } pdf)}$$

The posterior pdf for the above example can be represented as:

Posterior pdf=$p(d \mid y_{1:k})$=[0.10, 0.90]

In various implementations, an additional step may be needed for dynamic attributes. This step may involve determining the prior probability distribution function at current time, k, from the posterior probability distribution at the previous time step, k−1. This may be accomplished through the use of a transition density probability distribution function. A transition probability distribution function may encode the probability of transitioning from one state to another. For example, a transition probability function may encode the probability of transitioning from a state where an attribute is present to a state where the attribute is not present, or the probability of transitioning from a state where the attribute is not present to a state where an attribute is present.

Figure 9:
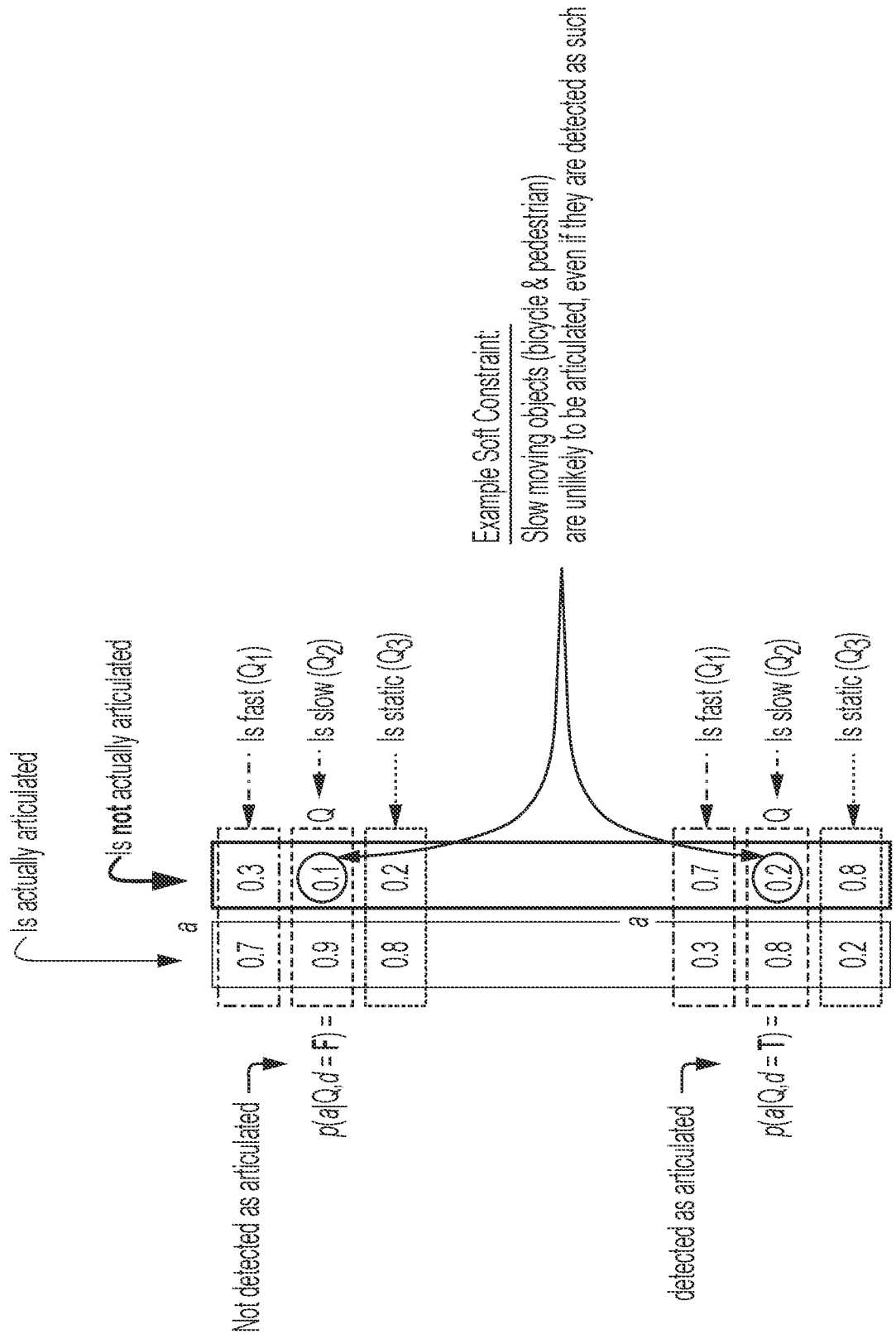
FIG. 9 illustrates an example compatibility constraint.

As discussed above, compatibility constraints may be defined rules about a relationship between an object type and an attribute. This relationship may be specific to one or more sample spaces. Compatibility constraints may be learned from historic data or offline data, and may be provided to the system. FIG. 9 illustrates an example compatibility constraint pertaining to sample space Q (from FIG. 5) according to various embodiments.

FIG. 9 illustrates example compatibility constraints according to various embodiments. As illustrated by FIG. 9, two different probability distributions across sample space Q are considered. The first 900 represents a probability distribution that an object is not detected as having an attribute, in this example, that attribute is being articulated. The second probability distribution 902 represents a likelihood that an object is detected as having the attribute (e.g., being articulated). The left column for each distribution represents a probability that an object actually has the attribute (e.g., actually is articulated), while the right column for each distribution represents a probability that an object does not actually have the attribute (e.g., is not articulated).

A compatibility constraint may exist that a slow moving object (e.g., a bicycle or a pedestrian) is unlikely to be articulated even if they are detected as such. For example, as illustrated by FIG. 9, there is a 0.1 probability that a slow object that is detected as not being articulated in the Q sample space is actually not articulated. And there is a 0.2 probability that a slow object that is detected as being articulated in the Q sample space is actually not articulated.

However, by applying the compatibility constraint, the system may use a probability distribution function that represents the fact that slow moving objects are unlikely to be articulated even if they are detected as such.

As discussed above, object type and attribute compatibility may be considered based on the following relationship:

$$p(a_k \mid z_{1:k}, y_{1:k}) = \sum_{\ell_k} \sum_{d_k} p(\ell_k, d_k, a_k \mid z_{1:k}, y_{1:k})$$
$$= \sum_{\ell_k} \sum_{d_k} p(\ell_k \mid y_{1:k}) p(d_k \mid z_{1:k}) p(a_k \mid \ell_k, d_k)$$

FIG. 10 illustrates an example relationship between object type and attribute compatibility for the above example pertaining to sample space Q. FIG. 10 also illustrates a detailed explanation of how the relationship is applied with specific example values. As shown by FIG. 10, despite there being a high probability that articulation was detected, the soft constraint that slow moving objects are unlikely to be articulated results in the object being unlikely to actually be articulated.

Referring back to FIG. 4, the system may execute 410 one or more vehicle control instructions. The one or more vehicle control instructions may cause an autonomous vehicle to adjust one or more of its driving operations based on the determined attribute probability distribution function. For example, one or more vehicle control instructions may cause an autonomous vehicle to adjust one or more of its driving operations based on a determined attribute probability distribution function when it encounters an object associated with the determined attribute probability distribution.

As an example, an autonomous vehicle may use a determined attribute probability distribution of an object to predict a state of the object forward in time and adjust operations of the autonomous vehicle accordingly. For instance, an autonomous vehicle may predict that an object having a VEHICLE object type is likely to follow road lanes and obey the rules of the road. The autonomous vehicle may predict that an object having a VEHICLE object type with an ARTICULATED attribute may be more likely to take a wide turn. As such, an autonomous vehicle may not pass such an object in proximity to an intersection.

As another example, an autonomous vehicle may pull over or stop when it detects an object having an EMERGENCY attribute such as, for example, a police vehicle, an ambulance, a fire truck, and/or the like.

In various implementations, the determined object type and/or attribute(s) associated with an object may be provided to one or more machine learning models. A "machine learning model" or a "model" refers to a set of algorithmic routines and parameters that can predict an output(s) of a real-world process (e.g., prediction of an object trajectory or behavior) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

The one or more machine learning models may generate data pertaining to a predicted trajectory or predicted behavior for an object. This data may be used by the autonomous vehicle to generate one or more vehicle control instructions that cause an autonomous vehicle to adjust one or more of its driving operations. For example, passing an object type of VEHICLE and an ATTRIBUTE type of EMERGENCY to one or more machine learning models may yield data indicating that the predicted trajectory of the object will be to pass the autonomous vehicle on the left at a high rate of speed. In response, the autonomous vehicle may use this data to generate one or more vehicle control instructions that cause the autonomous vehicle to apply the brakes and reduce its speed as the object approaches. Alternatively, the autonomous vehicle may use this data to generate one or more vehicle control instructions that cause the autonomous vehicle to navigate to a right-hand shoulder and stop its movement until the object passes. Additional and/or alternate object types, attributes, and/or actions may be used within the scope of this disclosure.

Figure 11:
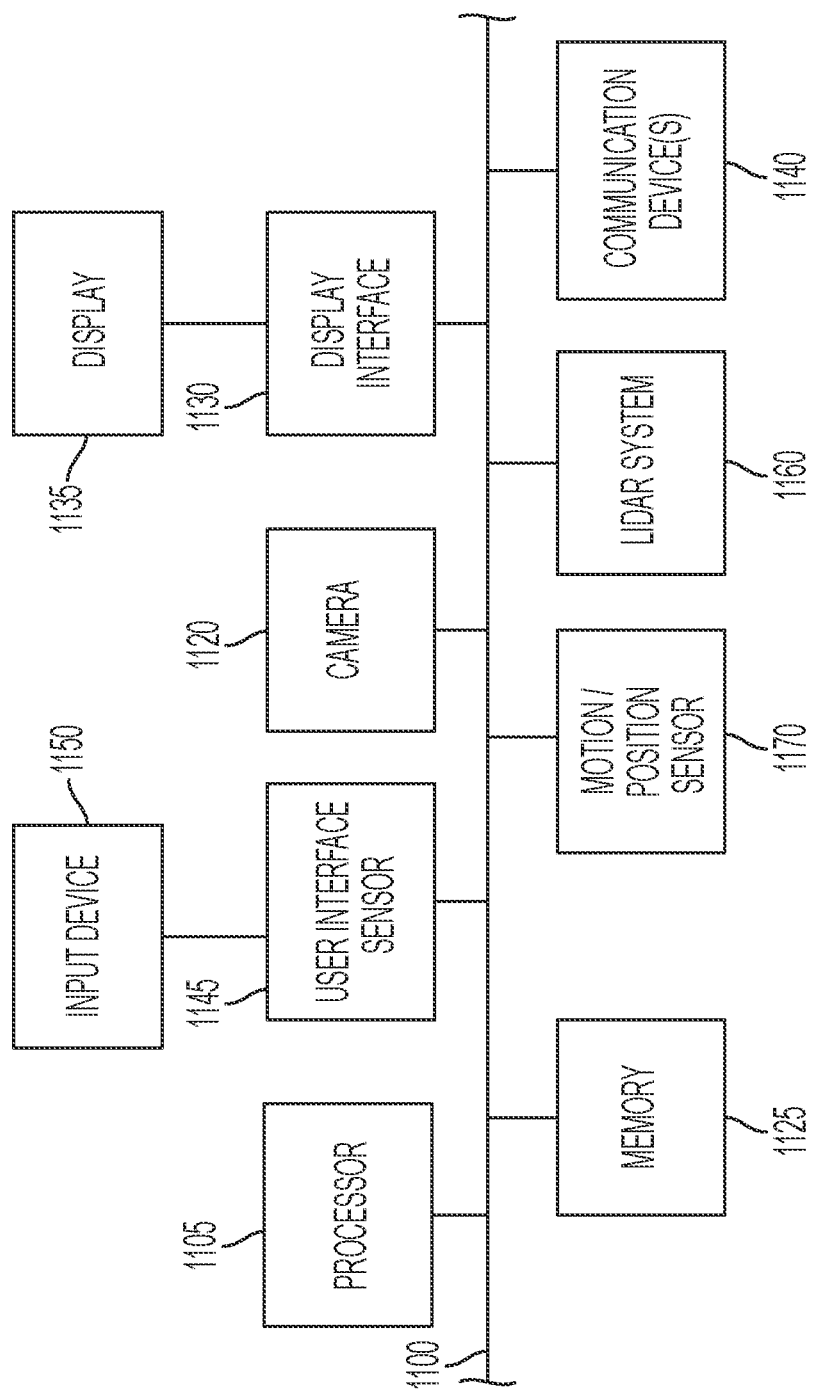
FIG. 11 is a block diagram that illustrates various elements of a possible electronic system, subsystem, controller and/or other component of an AV, and/or external electronic device.

FIG. 11 depicts an example of internal hardware that may be included in any of the electronic components of the system, such as internal processing systems of the AV, external monitoring and reporting systems, or remote servers. An electrical bus 1100 serves as an information highway interconnecting the other illustrated components of the hardware. Processor 1105 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 1125. A memory device may include a single device or a collection of devices across which data and/or instructions are stored. Various embodiments of the invention may include a computer-readable medium containing programming instructions that are configured to cause one or more processors-to perform the functions described in the context of the previous figures.

An optional display interface 1130 may permit information from the bus 1100 to be displayed on a display device 1135 in visual, graphic or alphanumeric format, such on an in-dashboard display system of the vehicle. An audio interface and audio output (such as a speaker) also may be provided. Communication with external devices may occur using various communication devices 1140 such as a wireless antenna, a radio frequency identification (RFID) tag and/or short-range or near-field communication transceiver, each of which may optionally communicatively connect with other components of the device via one or more communication system. The communication device(s) 1140 may be configured to be communicatively connected to a communications network, such as the Internet, a local area network or a cellular telephone data network.

The hardware may also include a user interface sensor 1145 that allows for receipt of data from input devices 1150 such as a keyboard or keypad, a joystick, a touchscreen, a touch pad, a remote control, a pointing device and/or microphone. Digital image frames also may be received from a camera 1120 that can capture video and/or still images. The system also may receive data from a motion and/or position sensor 1170 such as an accelerometer, gyroscope or inertial measurement unit. The system also may receive data from a LiDAR system 1160 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as image data, LIDAR system data, sensor data, and/or other data.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

As used in this document, the term "light" means electromagnetic radiation associated with optical frequencies, e.g., ultraviolet, visible, infrared and terahertz radiation. Example emitters of light include laser emitters and other emitters that emit converged light. In this document, the term "emitter" will be used to refer to an emitter of light, such as a laser emitter that emits infrared light.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method comprising:
   receiving an observation probability distribution function associated with a target object that was detected by one or more sensors of an autonomous vehicle;
   identifying a target attribute associated with the target object;
   detecting a target attribute value associated with the target attribute; and
   issuing one or more vehicle control instructions that cause the autonomous vehicle to adjust one or more driving operations using a future behavior of the target object predicted based on an attribute probability distribution function that defines a probability that the target attribute is actually present for the target object based on a plurality of probability distribution functions, wherein the attribute probability distribution function comprises:
      a probability value associated with the target attribute being present for the target object; and
      a probability value associated with the target attribute not being present for the target object, wherein:
   the plurality of probability distribution functions comprises:
      a first probability distribution function representing a probability of the autonomous vehicle detecting an object having one or more of object labels based on historical object type detections;
      a second probability distribution function defining a probability of the autonomous vehicle detecting the target attribute based on historical attribute detections; and
      a third probability distribution function defining a probability of the target attribute actually being present for the target object based on the target attribute value.

2. The method of claim 1, wherein the second probability distribution function comprises a probability distribution function over an event that the target object is detected as having the target attribute, wherein the second probability distribution function is conditioned on all observations made through a current time.

3. The method of claim 1, wherein the third probability distribution function is based on:
   a set of combinations of attributes and object types; and
   for each combination, an associated likelihood value representing a likelihood of the object type of the combination having the attribute of the combination.

4. The method of claim 1, wherein the historical object type detections are organized in a tree structure.

5. The method of claim 1, wherein the attribute probability distribution function is based on a sum of a product value across a target object label and the target attribute value, wherein the product value comprises a product of the first probability distribution function, the second probability distribution function, and the third distribution function.

6. The method of claim 1, wherein the one or more sensors are associated with one or more object type labels, and wherein the observation probability distribution function comprises a detection likelihood value associated with each of the one or more object type labels.

7. A system comprising:
   a memory; and
   a processor coupled to the memory and configured to:
      receive an observation probability distribution function associated with a target object that was detected by one or more sensors of an autonomous vehicle;
      identify a target attribute associated with the target object;
      detect a target attribute value associated with the target attribute;
      execute one or more vehicle control instructions that cause the autonomous vehicle to adjust one or more driving operations using a future behavior of the target object predicted based on an attribute probability distribution function that defines a probability that the target attribute is actually present for the target object based on a plurality of probability distribution functions, wherein the attribute probability distribution function comprises:
         a probability value associated with the target attribute being present for the target object, and
         a probability value associated with the target attribute not being present for the target object, wherein:
      the plurality of probability distribution functions comprises:
         a first probability distribution function representing a probability of the autonomous vehicle detecting an object having one or more of object labels based on historical object type detections;
         a second probability distribution function defining a probability of the autonomous vehicle detecting the target attribute based on historical attribute detections; and
         a third probability distribution function defining a probability of the target attribute actually being present for the target object based on the target attribute value.

8. The system of claim 7, wherein the second probability distribution function comprises a probability distribution function over an event that the target object is detected as having the target attribute, wherein the second probability distribution function is conditioned on all observations made through a current time.

9. The system of claim 7, wherein the third probability distribution function is based on:
   a set of combinations of attributes and object types; and
   for each combination, an associated likelihood value representing a likelihood of the object type of the combination having the attribute of the combination.

10. The system of claim 7, wherein the historical object type detections are organized in a tree structure.

11. The system of claim 7, wherein the attribute probability distribution function is based on a sum of a product value across a target object label and the target attribute value, wherein the product value comprises a product of the first probability distribution function, the second probability distribution function, and the third distribution function.

12. The system of claim 7, wherein the one or more sensors are associated with one or more object type labels, and wherein the observation probability distribution function comprises a detection likelihood value associated with each of the one or more object type labels.

13. A non-transitory computer-readable medium that stores instructions that is configured to, when executed by at least one computing device, cause the at least one computing device to perform operations comprising:
   receiving an observation probability distribution function associated with a target object that was detected by one or more sensors of an autonomous vehicle;
   identifying a target attribute associated with the target object;
   detecting a target attribute value associated with the target attribute; and
   issuing one or more vehicle control instructions that cause the autonomous vehicle to adjust one or more driving operations using a future behavior of the target object predicted based on an attribute probability distribution function that defines a probability that the target attribute is actually present for the target object based on a plurality of probability distribution functions, wherein the attribute probability distribution function comprises:
      a probability value associated with the target attribute being present for the target object; and
      a probability value associated with the target attribute not being present for the target object, wherein:
         a first probability distribution function representing a probability of the autonomous vehicle detecting an object having one or more of object labels based on historical object type detections,
         a second probability distribution function defining a probability of the autonomous vehicle detecting the target attribute based on historical attribute detections, and
         a third probability distribution function defining a probability of the target attribute actually being present for the target object based on the target attribute value.

14. The non-transitory computer-readable medium of claim 13, wherein the second probability distribution function comprises a probability distribution function over an event that the target object is detected as having the target attribute, wherein the second probability distribution function is conditioned on all observations made through a current time.

15. The non-transitory computer-readable medium of claim 13, wherein the third probability distribution function is based on:
   a set of combinations of attributes and object types; and
   for each combination, an associated likelihood value representing a likelihood of the object type of the combination having the attribute of the combination.

16. The non-transitory computer-readable medium of claim 13, wherein the attribute probability distribution function is based on a sum of a product value across a target object label and the target attribute value, wherein the product value comprises a product of the first probability distribution function, the second probability distribution function, and the third distribution function.

17. The non-transitory computer-readable medium of claim 13, wherein the one or more sensors are associated with one or more object type labels, and wherein the observation probability distribution function comprises a detection likelihood value associated with each of the one or more object type labels.

* * * * *